United States Patent [19]

Nagaoka

[11] Patent Number: 5,378,406
[45] Date of Patent: Jan. 3, 1995

[54] FUNGIRESISTANT POLYORGANOSILOXANE COMPOSITION

[75] Inventor: Hisayuki Nagaoka, Tokyo, Japan
[73] Assignee: Toshiba Silicone Co., Ltd., Tokyo, Japan
[21] Appl. No.: 89,552
[22] Filed: Jul. 12, 1993
[30] Foreign Application Priority Data Jul. 24, 1992 [JP] Japan .................. 4-197927

[51] Int. Cl.$^6$ ............ C08L 83/04; C08L 83/05; H01B 1/12
[52] U.S. Cl. .................... 252/511; 524/94; 524/198; 524/267; 524/434; 524/395; 524/399; 524/506
[58] Field of Search ......... 252/511, 198, 94, 395; 524/399, 506, 267, 434

[56] References Cited

U.S. PATENT DOCUMENTS

| | | | |
|---|---|---|---|
| 4,164,582 | 8/1979 | Harju-Jeanty | 424/276 |
| 4,537,944 | 8/1985 | Imai et al. | 524/267 |
| 4,666,745 | 5/1987 | Huhn et al. | 524/506 |
| 5,015,413 | 5/1991 | Nagaoka | 252/511 |
| 5,051,467 | 9/1991 | Okinoshima et al. | 524/267 |
| 5,066,714 | 11/1991 | Inoue et al. | 524/267 |
| 5,219,922 | 6/1993 | Steinberger et al. | 524/434 |
| 5,248,716 | 9/1993 | Lin et al. | 524/267 |

FOREIGN PATENT DOCUMENTS

| | | |
|---|---|---|
| 0000892 | 3/1979 | European Pat. Off. |
| 0419242 | 3/1991 | European Pat. Off. |
| 0497163 | 8/1992 | European Pat. Off. |

OTHER PUBLICATIONS

Patent Abstracts of Japan, vol. 007, No. 143 (P-143) Jun. 1983 & JP-A-58 057,367 (Shintou Toriyou) Apr. 5, 1983 *abstract*.

*Primary Examiner*—Wayne Langel
*Attorney, Agent, or Firm*—Sughrue, Mion, Zinn, Macpeak & Seas

[57] ABSTRACT

A fungiresistant polyorganosiloxane composition comprising
(A) 100 parts by weight of a polyorganosiloxane having a viscosity at 25° C. of from 100 to 500,000 cSt, each of both the terminals of which being blocked with a silanol group or an alkoxy group,
(B) from 0.1 to 20 parts by weight of an organisilicon compound having on the average more than 2 hydrolyzable groups each bonded to a silicon atom in the molecule,
(C) from 0.001 to 25 parts by weight of a benzimidazolylcarbamate compound represented by the formula

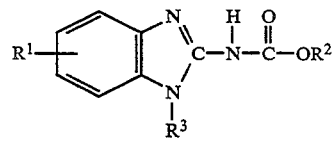

wherein $R^1$ represents a hydrogen atom, an alkyl group having from 1 to 4 carbon atoms, a halogen atom, or a nitro group; $R^2$ represents an alkyl group having from 1 to 4 carbon atoms or an alkoxyalkyl group having from 2 to 4 carbon atoms: and $R^3$ represents a hydrogen atom, an N-substituted or unsubstituted carbamoyl group or an N-substituted or unsubstituted carbamoyloxy group, and
(D) from 0.001 to 25 parts by weight of bis(2-pyridylthio-1-oxide) zinc salt shown by the formula

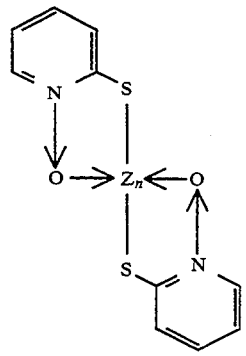

11 Claims, No Drawings

FUNGIRESISTANT POLYORGANOSILOXANE COMPOSITION

FIELD OF THE INVENTION

The present invention relates to a fungiresistant polyorganosiloxane composition, and more particularly to a fungiresistant polyorganosiloxane composition restraining growth of microorgnisms such as fungi, bacteria, etc, by containing a benzimidazolyl carbamate compound and bis (2-pyridylthio-1-oxide) zinc salt as essential components.

BACKGROUND OF THE INVENTION

A polyorganosiloxane composition which is cured at normal temperature to fore a rubbery elastic material has been widely used as electrically insulating sealants, sealants for construction, etc. However, since such a kind of composition is spoiled by microorganisms such as fungi, bacteria, etc., according to environmental conditions after curing, the composition is discolored or stained, whereby not only the appearance of the composition is spoiled but also it frequently happens that a sealing property, an electrically insulating property, etc. , which are the essential functions of the composition, are decreased.

For preventing occurrence of those disadvantages, it has been practiced to add a material having an effect of killing microorganisms to the composition. However, in a composition having added thereto a conventional fungicide, it is impossible to sufficiently prevent growth of microorganisms and keep the effect for a long period of time. Also, when such a fungicide is added to the composition, according to the kinds of the base polymer and a crosslinking agent used for the polymer, there is a problem that the fungicide adversely affects the storage stability, the color tone, the adhesive property, etc., of the composition.

To overcome the above problems, JP-A-56-38348 (the term "JP-A" as used herein means an "unexamined published Japanese patent application") discloses use of an N-substituted benzimidazole carbamate as a fungiproofing agent for a room-temperature curing polyorganosiloxane composition. This compound does not color the composition when the composition contianing the compound is stored for a long period of time and is excellent in the fungus resistance, but the fungus resistance after a warm water deterioration test, etc., for a long period of time is yet insufficient according to a purpose. Hence a further improvement has been required.

JP-A-2-306907 discloses use of p-chloro-m-xylenol together with bis(2-pyridylthio-1-oxide) zinc salt as an anti-fungus agent for a modified silicone sealant. Since in the modified silicone sealant, polyoxypropylene is the base polymer and a crosslinked point only is the disiloxane bond, the modified silicone sealant is chemically different from a polyorganosiloxane sealant and is rather similar to a polyurethane sealant. Therefore, JP-A-2-306907 does not suggest that such an antifungus agent is effective for a polyoxyorganosiloxane sealant. In fact, in the case of a polyorganosiloxane sealant, bis(2-pyridylthio-1-oxide) zinc salt itself does not show a sufficient fungus resistance. On the other hand, in the case of using p-chloro-m-xylenol as an antifungus substance for a polyorganosiloxane sealant, when a silane or a siloxane having an oxime group in the molecule is used as a crosslinking agent, the sealant increases the viscosity during the storage, whereby the storage stability of the sealant is reduced. Accordingly, there is a disadvantage that the selection of a crosslinking agent is restrained.

SUMMARY OF THE INVENTION

Accordingly, an object of the present invention is to overcome the disadvantages of the conventional techniques as described above and to provide a fungiresistant composition capable of preventing the growth of microorganisms such as fungi, etc., for a long period of time without discoloring the composition and without lowering the properties thereof during the storage.

As the result of various investigations to attain the above-described object, it has been found that the above-described object can be attained by co-using a specific benzimidazolylcarbamate compound and a bis(2-pyridylthio-1oxide) zinc salt and in particular the fungus resistance can continue for a long period of time corresponding to the excellent weather resistance of an organosiloxane sealant. The present invention has been completed based on this finding.

That is, according to the present invention, there is provided a fungiresistant polyorganosiloxane composition comprising (A) 100 parts by weight of a polyorganosiloxane having a viscosity at 25° C. of from 100 to 500,000 cSt., the terminal of which being blocked with a silanol group or an alkoxy group, (B) from 0.1 to 20 parts by weight of an organosilicon compound having on the average more than two hydrolyzable groups each bonded to a silicon atom in the molecule, (C) from 0.001 to 25 parts by weight of a benzimidazolylcarbamate compound represented by the formula

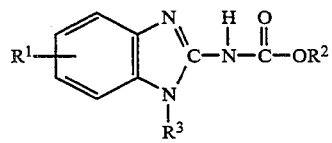

wherein $R^1$ represents a hydrogen atom, an alkyl group having from 1 to 4 carbon atoms, a halogen atom, or a nitro group; $R^2$ represents an alkyl group having from 1 to 4 carbon atoms or an alkoxyalkyl group having from 2 to 4 carbon atoms; and $R^3$ represents a hydrogen atom, an N-substituted or unsubstituted carbamoyl group or an N-substituted or unsubstituted carbamoyloxy group, and (D) from 0.001 to 25 parts by weight of bis(2-pyridylthio-1-oxide) zinc salt represented by the formula

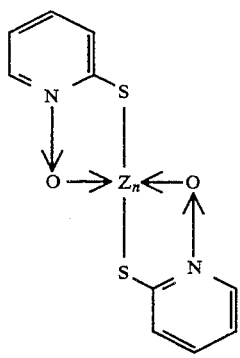

DETAILED DESCRIPTION OF THE INVENTION

The present invention is described in detail below.

Each component used in the composition of the present invention is explained.

The component (A) used in the present invention is a polydiorganosiloxane the terminal of which is blocked with a silanol group or an alkoxy group, which is usually used for this kind of a condensation type polyorganosiloxane composition capable of being cured at room temperature and in particular, it is necessary that the viscosity thereof at 25° C. is in range of from 100 to 500,000 cSt to impart a proper extrudability to the composition before curing and also impart excellent mechanical characteristics to the rubbery elastic material formed after curing the composition.

If the viscosity is less than 100 cSt, the mechanical characteristics of the rubbery elastic material formed after curing the composition are insufficient, while if the viscosity is over 500,000 cSt, it is difficult to obtain a uniform composition and the extruding workability becomes poor.

The particularly preferred viscosity range is from 2,000 to 100,000 cSt. If the viscosity is less than 2,000 cSt, it sometimes happens that the composition flows down to contaminate surroundings, while if the viscosity is over 100,000 cSt, there is a tendency to reduce the extrusion workability of the composition.

The component (A) has an organic group directly bonded to the silicon atom therein, and examples of the organic group are an alkyl group such as methyl, ethyl, propyl, butyl, hexyl, etc.; an alkenyl group such as vinyl, allyl, etc.,; an aryl group such as phenyl, etc.; an aralkyl group such as 2-phenylethyl, 2-phenylpropyl, etc.; and a monovalent substituted hydrocarbon group such as chloromethyl, β-cyanoethyl, 3,3,3-trifluoropropyl, etc. From the easiness of the synthesis of the polymer, methyl, vinyl, or phenyl is generally advantageous and other organic groups are recommeneded only in the case of imparting a specific property such as an oil resistance, a coating aptitude, etc., to the rubbery elastic material formed after curing. Of those groups, methyl is such that not only the raw material intermediate is easily obtained but also the lowest viscosity is imparted in spite of the degree of polymerization of siloxane to make advantageous the balance of the extrusion workability of the composition before curing and the properties of the rubbery elastic material formed after curing. Therefore, it is preferred that at least 85% of all the organic groups are methyl groups, and it is more preferred that substantially all the organic groups are methyl groups. In this case, however, when a cold resistance and a heat resistance is required for the rubbery elastic material formed after curing, it is recommeneded to use a phenyl group as a part of the organic groups.

The silanol group or the alkoxy group at the terminal of the molecule contributes to cure by the reaction with the hydrolyzed product of the component (B). Examples of the alkoxy group are methoxy, ethoxy, isopropoxy, etc. Of those terminal groups, a silanol group or a methoxy group is preferred from the point of the reactivity.

The component (B) used in the present invention is hydrolyzed with moisture and easily causes the condensation reaction with the silanol group or the alkoxy group of the component (A). The component (B) is an organosilicon compound wherein on the average more than two hydrolyzable groups each bonded to a silicon atom exist in one molecule. Examples of the hydrolyzable group are an alkoxy group such as methoxy, ethoxy, propoxy, isopropoxy, butoxy, etc.; an enoxy group such as propenoxy, etc.; an acyloxy group such as acetoxy, benzoxy, etc.; an isocyanato group; an oxime group such as acetoneoxime, butanoneoxime, etc.; an organoaminoxy such as dimethylaminoxy, diethylaminoxy, etc.; an organoamino group such as dimethylamino, diethylamino, cyclohexylamino, isopropylamino, etc.; and an amido group such as N-methylacetamido, etc. As the case may be, a halogen atom such as chlorine, etc., can be used but in general, the use of such a halogen atom is undesirable due to the severe corrosive property and irritative property of a hydrogen halide formed by hydrolysis.

Other group bonded to each silicon atom of the component (B) in addition to the above-described hydrolyzable group is a substituted or unsubstituted hydrocarbon group, and from the easiness of the synthesis of the organosilicon compound itself and the crosslinking speed, an alkyl group having from 1 to 8 carbon atoms, an alkenyl group having from 2 to 5 carbon atoms, and a phenyl group are preferred as the hydrocarbon group.

Examples of the component (B) are alkoxysilanes such as methyltrimethoxysilane, vinyltrimethoxysilane, methyltriethoxysilane, ethyl orthosilicate, propyl orthosilicate, etc., and the partially hydrolyzed condensates thereof; alkoxysiloxanes such as the siloxane represented by the formula

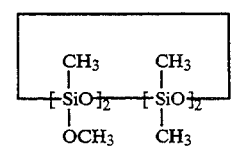

enoxysilanes such as methyltripropenoxysilane, etc., and the partially hydrolyzed condensates thereof; acyloxysilanes such as methyltriacetoxysilane, vinyltriacetoxysilane, methyltribenzoxysilane, diacetoxydibutoxysilane, etc., and the partially hydrolyzed condensates thereof; acyloxysiloxanes such as $(CH_3COO)(CH_3)_2Si-OSi(CH_3)_2(OCOCH_3)$, $C_6H_5Si[OSi(OCOCH_3)_3]_3$, etc.; isocyanatosilanes such as tetraisocyanatosilane, methyltriisocyanatosilane, etc., and the partially hydrolyzed condensates thereof; oximesilanes such as methyltris(acetoneoxime)silane, methyltris(butanoneoxime)silane, etc., and the partially hydrolyzed condensates thereof; oximesiloxanes such as the oximesiloxane represented by the formula

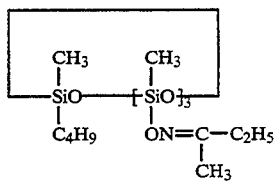

aminoxysilanes such as methyltris(dimethylaminoxy)silane, methyltris(diethylaminoxy)silane, etc.; aminoxysiloxanes such as the aminoxysiloxane represented by the formula

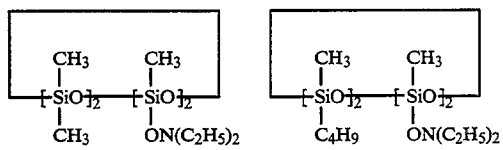

aminosilanes such as methyltris(dimethylamino)silane, methyltris(diethylamino)silane, methyltris(isopropylamino)silane, methyltris(cyclohexylamino)silane, etc., and the partially hydrolyzed condensates thereof; aminosiloxanes such as $(CH_3)_2N[(CH_3)_2SiO]_{-}(CH_3)_2SiN(CH_3)_2$, etc.; and amidosilanes such as methyltris(N-methylacetamido)silane, etc., and the partially hydrolyzed condensates thereof.

In the above-described compounds, the compound wherein the number of the hydrolyzable groups each bonded to a silicon atom existing in one molecule is only 2 cannot be used as the component (B) by itself, but can be used in combination with the compound having 3 or more hydrolyzable groups each bonded to a silicon atom in one molecule.

The amount of the component (B) compounded differs according to the amount of the silanol group or the alkoxy group in component (A) and the properties of the desired rubbery elastic material, but is usually from 0.1 to 20 parts by weight, and preferably from 0.5 to 10 parts by weight, per 100 parts by weight of the component (A). If the amount of the component (B) is less than 0.1 part by weight, crosslinking is not sufficiently conducted and if the amount of the component (B) is over 20 parts by weight, the properties of the rubbery elastic material formed after curing the composition of the present invention are decreased.

The benzimidazolylcarbamate compound used as the component (C) in the present invention functions to prevent the growth of microorganisms. This component has a durability of the effect as compared with conventional fungicides and does not decrease the properties of the composition of the present invention.

The production processes of the benzimidazolylcarbamate compounds are conventional.

From the easiness of the synthesis of the compound, $R^1$ in the formula showing the benzimidazolylcarbamate compound described as the component (C) above is preferably hydrogen atom or methyl group and when $R^1$ is methyl group, it is preferred that $R^1$ is bonded to the 5-position or the 6-position of the benzimidazole skeleton.

Similarly, from the easiness of the synthesis of the compound, $R^2$ in the formula is preferably methyl group and $R^3$ is preferably hydrogen atom or carbamoyl group or carbamoyloxy group each substituted with an alkyl group having from 1 to 4 carbon atoms.

Examples of the benzimidazolylcarbamate compound are methyl 2-benzimidazolylcarbamate, ethyl 2-benzimidazolylcarbamate, isopropyl 2-benzimidazolylcarbamate, methyl N-{2-[1-(N,N-dimethylcarbamoyl)benzimidazolyl]}carbamate, methyl N-{2-[1-(N,N-dimethylcarbamoyl)-6-methylbenzimidazolyl]}carbamate, methyl N-{2-[1-(N,N-dimethylcarbamoyl)-5-methylbenzimidazolyl]}carbamate, methyl N-{2-[1-(N-methylcarbamoyl)benzimidazolyl]}carbamate, methyl N-{2-[1-(N-methylcarbamoyl)-6-methylbenzimidazolyl]}carbamate, methyl N-{2-[1-(N-methylcarbamoyl)-5-methylbenzimidazolyl]}carbamate, ethyl N-{2-[1-(N,N-dimethylcarbamoyl)benzimidazolyl]}carbamate, ethyl N-{2-[2-(N-methylcarbamoyl)benzimidazolyl]}carbamate, ethyl N-{2-[1-(N,N-dimethylcarbamoyl)-6-methylbenzimidazolyl]}carbamate, ethyl N-{2-[1-(N-methylcarbamoyl)-6-methylbenzimidazolyl]}carbamate, isopropyl N-{2-[1-(N,N-dimethylcarbamoyl)benzimidazolyl]}carbamate, isopropyl N-{2-[1-(N-methylcarbamoyl)benzimidazolyl]}carbamate, methyl N-{2-[1-(N-propylcarbamoyl)benzimidazolyl]}carbamate, methyl N-{2-[1-(N-butylcarbamoyl)benzimidazolyl]}carbamate, methoxyethyl N-{2-[1-(N-propylcarbamoyl)benzimidazolyl]}carbamate, methoxyethyl N-{2-[1-(N-butylcarbamoyl)benzimidazolyl]}carbamate, ethoxyethyl N-{2-[1-(N-propylcarbamoyl)benzimidazolyl]}carbmate, ethoxyethyl N-{2-[1-(N-butylcarbamoyl)benzimidazolyl]}carbamate, methyl N-{1-(N,N-dimethylcarbamoyloxy)benzimidazolyl]}carbamate, methyl N-{2-[N-methylcarbamoyloxy)benzimidazolyl]}carbamate, methyl N-{2-[1-(N-butylcarbamoyloxy)benzoimidazolyl]}carbamate, ethoxyethyl N-{2-[1-(N-propylcarbamoyl)benzimidazolyl]}carbamate, ethoxyethyl N-{2-[1-(N-butylcarbamoyloxy)benzoimidazolyl]}carbamate, methyl N-{2-[1-(N,N-dimethylcarbamoyl)-6-chlorobenzimidazolyl]}carbamate, and methyl N-{2-[1-(N,N-dimethylcarbamoyl)-6-nitrobenzimidazolyl]}carbamate.

The amount of the component (C) added is from 0.001 to 25 parts by weight, and preferably from 0.01 to 1 part by weight, per 100 parts by weight of the component (A). If the amount is less than 0.001 part by weight, the effect thereof is not obtained and if the amount is over 25 parts by weight, the mechanical characteristics of the rubber elastic material obtained after curing the compopsition of the present invention are decreased.

Bis(2-pyridylthio-1-oxide) zinc salt used as the component (D) in the present invention also contributes to restrain the growth of microorganisms. This component has a high antifungus effect and a long durability as compared with conventional fungicides and does not decrease the properties of the composition of the present invention. The production process of the compound is established and is known.

The amount of the component (D) added is from 0.001 to 25 parts by weight, and preferably from 0.01 to 1 part by weight, per 100 parts by weight of the component (A). If the amount of this component added is less than 0.001 part by weight, the effect is not obtained and if the amount is over 25 parts by weight, the mechanical properties of the rubber elastic material formed after curing are decreased.

Method for adding the components (C) and (D), which are the antifungus substances, are a method of directly adding to the organosiloxane composition followed by kneading, a method of previously dispersing in a dimethylsilicone oil to form a pasty mixture and adding the pasty mixture to the organosiloxane composition, a method of dissolving in a solvent having a good compatibility and adding the solution to the organosiloxane composition, etc.

In the present invention, according to the kind of the component (B) used, the reaction may proceed at normal temperature without a catalyst. However, it is preferred in many cases to add a catalyst for accelerating the crosslinking reaction.

Examples of the catalyst are amine compounds such as dimethylhexylamine, diethylhydroxylamine, tetramethylguanidine, etc.; quaternary ammonium salts such as tetramethylammonium chloride, trimethylhexylammoniumchloride, etc.; metal organic acid salts such as zinc octanate, tin octanate, etc.; organic metal compounds such as dibutyltin diacetate, dibutyltin dioctonate, dibutyltin dilaurate, dioctyltin dilaurate, etc.; and titanium compounds such as tetrabutyl titanate, 1,3-dioxypropanetitane-bis(ethylacetoacetate), etc.

There is no particular restriction on the amount of the catalyst added, but in the case of, for example, dibutyltin dilaurate, the proper amount thereof is from 0.05 to 1 part by weight per 100 parts by weight of the component (A).

The composition of the present invention containing the components (A) to (D) described above is usually compounded with an inorganic filler for imparting a proper flowability or an extrudability to the composition before curing. The inorganic fillers are those known in the field of the art. Examples thereof are fumed silica, precipitated silica, silica aerogel, ground silica, diatomaceous earth, and calcium carbonate. Those inorganic fillers may be used alone or as a mixture thereof. Further, the filler may be used as is or may be used after treating the surface thereof with an organosilicon compound such as polydimethylsiloxane, octamethylcyclotetrasiloxane, hexamethyldisilazane, etc.

Furthermore, an electrically conductive filler such as carbon black, graphite, a metal powder, iron oxide, tin oxide, potassium titanate or titanium oxide surface-treated with antimony oxide-tin oxide, or the like can be compounded with the composition to impart the electrical conductivity to the composition after curing.

The amount of such a filler compounded differs according to the kind of the filler used and the purpose of use of the composition, but is preferably in the range of from 1 to 150 parts by weight per 100 parts by weight of the component (A). If the amount thereof added is less than 1 part by weight, the effect of adding the filler is not obtained and if the amount thereof is over 150 parts by weight, the workability of the composition in the uncured state becomes poor and also the composition after curing does not show sufficient mechanical properties.

The composition of the present invention may also contain a flame retardant to impart a flame retardant property to the composition. The preferred flame retardant is a platinum compound. Example of the platinum compound are chloroplatinic acid, a complex of vinylsiloxane and a platinum compound, a complex obtained from an alcohol and a platinum compound, a platinum-triphenylphosphine complex, etc.

A method for adding such a platinum compound is a method of dissolving the platinum compound in, for example, the component (A). The amount of the platinum compound added is preferably from 0.0001 to 0.1 part by weight, and more preferably from 0.001 to 0.01 part by weight, per 100 parts by weight of the component (A). If the amount thereof is less than 0.0001 part by weight, the flame retardant effect is insufficient and if the amount thereof is over 0.1 part by weight, no further effect proportionate to the amount is not obtained and the addition of such a large amount gives a bad influence on the heat resistant, etc., of the composition.

The composition of the present invention can be prepared by mixing the components (A) to (D) and, if necessary, the inorganic filler, the catalyst and/or various additives, in a state of intercepting humidity. Those components can be used as a so-called one-part type room-temperature curable polysiloxane composition wherein those components are stored together in a closed container and at use, they are cured by exposing to the moisture in air. Furthermore, those components may be used as a so-called two-part type room-temperature curable polysiloxane composition wherein the component (A) and the component (B), if necessary, together with a part of the catalyst are stored in one container and other components are stored in another container, and those components contained in separate containers are mixed at use.

By using the component (C) and the component (D) as antifungus substances, the composition of the present invention shows a very effective antifungus activity to Aspergillus, Penicillium, Cladosporium, Gliocladium, Aureobasidium, Mucor, Paecilomyces, Eurotium, Rhizopus, Trichoderma, Alternaria, Fusarium, Saccharomyces, Rhodotorula, Bacillus, Escherichia, Aerobacter, Staphylococcus, Pseudomonas, Serratia, etc.

According to the present invention, the growth of microorganisms in the room-temperature curable polyorganosiloxane composition can be prevented for a long period of time and such an effect can be sufficiently obtained without discoloration of the composition during the storage thereof and without deterioration the properties of the composition. In particular, the synergistic effect obtained using the component (C) and the component (D) as the effective components is large and the improvement effect of fungus resistance after warm water immersion is particularly remarkable.

The composition of the present invention is particularly effective as a fungiresistant sealant used at a high-humidity place.

The present invention is described in more detail by reference to the following Examples but the invention is not limited to those Examples. In the following Examples and Comparative Examples, all parts, percents, ratios and the like are by weight, unless otherwise indicated.

EXAMPLE 1

100 Parts of polydimethylsiloxane having a viscosity at 25° C. of 10,000 cSt, each of both the terminals of which was blocked with a silanol group, 13 parts of fumed silica (specific surface area of about 200 m$^2$/g) surface-treated with polydimethylsiloxane, 0.1 part of methyl 2-benzimidazolylcarbamate, and 0.1 part of bis(2-pyridylthio-1-oxide) zinc salt were uniformly kneaded. 7 Parts of methyl tris(butanoneoxime)silane and 0.2 part of dibutyltin dilaurate were added to the kneaded mixture in a state of intercepting humidity followed by kneading to obtain a room-temperature curable polysiloxane composition.

When the composition thus obtained was stored in a closed container intercepting humidity for 12 months, the composition was stable and was not discolored. Also, the composition was extruded into a sheet having a thickness of 2 mm and allowed to stand at room temperature for 7 days to cure, whereby a rubbery elastic material was obtained.

On the rubbery elastic material, a fungus resistance test was conducted according to JIS Z2911. That is, immediately after curing, the rubbery elastic material was immersed in warm water at 50° C. for one month, and then deteriorated by means of a weatherometer for 250 hours. By using the thus-obtained rubbery elastic material as a test piece, a cultivation was conducted using mixed bacteria of *Aspergillus niger* ATCC 6275, *Penicillium citrinum* ATCC 9849, *Rhizopus nigricans* SN 32, *Cladosporium herbarum* IAN F24, and *Chaetomium globosum* ATCC 6205 and a culture medium shown in Table 1 below at 28° C.±2° C. for 28 days, and the surface state of the test piece was observed. The results obtained are shown in Table 1 below.

Comparative Example 1, antifungus substance was not used; in Comparative Examples 2 and 4, each one only of the antifungus substances used in Example 1 was used, respectively; in Comparative Example 3, the N-substituted product only of the antifungus substance used in Comparative Example 2 was used; and in Comparative Example 5, 0.1 part of methyl 2-benzimidazolylcarbamate was used together with an antifungus substance other than that of the present invention.

The total amount of the antifungus substance(s) used was 0.2 part as in Example 1 except for Comparative Example 1.

When each of those compounds was stored in a closed container intercepting humidity for 12 months, they were all stable and were not discolored during the storage.

Each test piece was prepared from each of those compositions in the same manner as in Example 1 and subjected to the fungus resistance test in the same manner as in Example 1. The results obtained are shown in Table 2 below.

TABLE 2

|  | Antifungus Substance (part) | Fungus Resistance* | | |
| --- | --- | --- | --- | --- |
|  |  | Initial | After 1 month water immersion | After 250 hours deterioration |
| Example 1 | Methyl 2-benzimidazolyl-carbamate (0.1) Bis(2-pyridylthio-1-oxide) zinc salt (0.1) | 3 | 3 | 3 |
| Example 2 | Methyl N-{2-[1-(N-methylcarbamoyl)benzimidazolyl]}carbamate (0.1) Bis(2-pyridylthio-1-oxide) zinc salt (0.1) | 3 | 3 | 3 |
| Comparative Example 1 | — | 2 | 1 | 1 |
| Comparative Example 2 | Methyl 2-benzimidazolyl-carbamate (0.2) | 3 | 1 | 1 |
| Comparative Example 3 | Ethyl N-{2-[1-(N,N-dimethylcarbamoyl)benzimidazolyl]}-carbamate (0.2) | 3 | 2 | 1 |
| Comparative Example 4 | Bis(2-pyridylthio-1-oxide) zinc salt (0.2) | 3 | 1 | 1 |
| Comparative Example 5 | Methyl 2-benzimidazolyl-carbamate (0.1) 2-(4-Thiazolyl)-benzimidazole (0.1) | 3 | 1 | 2 |

Note
*: Indication of fungus resistance
3: Growth of fungi was not observed on the test piece
2: Growth of fungi was observed on the test piece (growth area ≦ ⅓)
1: Growth of fungi was observed on the test piece (growth area > ⅓)

| Component | Amount |
| --- | --- |
| $NH_4NO_3$ | 3.0 g |
| $KH_2PO_4$ | 1.0 g |
| $MgSO_4.7H_2O$ | 0.5 g |
| KCl | 0.25 g |
| $FeSO_4.7H_2O$ | 0.002 g |
| Agar agar | 25 g |
| Water | 1,000 ml |

EXAMPLE 2 AND, COMPARATIVE EXAMPLES 1 TO 5

By following the same procedure as in Example 1 except that the antifungus substances as shown in Table 2 below were used, each of compositions was prepared.

That is, in Example 2, methyl N-{2-[1-(N-methylcarbamoyl)benzimidazolyl)carbamate was used in place of methyl 2-benzimidazolylcarbamate in Example 1; in

EXAMPLE 3

100 Parts of polydimethylsiloxane having a viscosity at 25° C. of 10,000 cSt, each of both the terminals of which was blocked with a silanol group, 13 parts of fumed silica (specific surface area of about 200 m²/g) surface-treated with polydimethylsiloxane, 0.1 part of methyl 2-benzimidazolylcarbamate, and 0.1 part of bis(2-pyridylthio-1-oxide) zinc salt were uniformly mixed. 3.0 Parts of methyltriacetoxysilane and 0.06 part of dibutyltin diacetate were added to the kneaded mixture in a state of intercepting humidity followed by kneading to obtain a room-temperature curable polysiloxne composition.

When the composition was stored in a closed vessel intercepting humidity for 12 months, the composition was stable and was not discolored during the storage.

Also, the composition was cured and subjected to the fungus resistant test in the same manner as in Example 1. The result showed that no growth of fungi was observed on the test piece after any conditions and the test piece maintained the initial state.

EXAMPLE 4

100 Parts of polydimethylsiloxane having a viscosity at 25° C. of 20,000 cSt, each of both the terminals of which was blocked with a methyldimethoxysilyl group, 15 parts of fumed silica (specific surface area of about 180 m²/g) surface-treated with polydimethylsiloxane, 10 parts of polydimethylsiloxane having a viscosity at 25° C. of 100 cSt, 0.15 part of methyl N-{2-[1-(N-methylcarbamoyl)benzimidazolyl]}carbamate, and 0.15 part of bis (2-pyridylthio-1-oxide ) zinc salt were uniformly mixed. 2.0 Parts of vinyltriethoxysilane and 0.05 part of dibutyltin dilaurate were added to the kneaded mixture in a state intercepting humidity followed by kneading to obtain a room-temperature curable polysiloxane composition.

When the composition was stored in a closed vessel intercepting humidity for 12 months, the composition was stable and was not discolored during the storage. Also, the composition was cured and subjected to the funguses resistant test in the same manner as in Example 1. The result showed that no growth of fungi was observed on the test piece after any conditions and the test piece maintained the initial beautiful appearance.

TEST EXAMPLE (PRACTICAL TEST)

Each of the compositions prepared in Examples 1 to 4 and Comparative Examples 1 to 5 was placed on an aluminum plate in a sheet form having a width of 1 cm, a length of 10 cm and a thickness of 0.2 cm and cured to obtain each test material.

Each test material thus formed was horizontally placed at one corner of a bath room of a house with the surface which had been in contact with the aluminum plate above, the bath room was used for one year at a use frequency and a use state of an ordinary house, and the test material was allowed to stand for one year while spontaneously applying a living waste water formed during the period onto the test material. The growing state of fungi on the surface of the composition of each test material after one year was inspected. The results showed that no growth of fungi was observed on the compositions obtained in Examples 1 to 4 and the compositions maintained the color and the beautiful apperance at the formation of the test materials as shown in Table 3 below.

TABLE 3

| Composition | Growth State of Fungi | Note |
| --- | --- | --- |
| Example 1 | No growth | Kept initial color and beautiful view |
| Example 2 | No growth | Kept initial color and beautiful view |
| Example 3 | No growth | Kept initial color and beautiful view |
| Example 4 | No growth | Kept initial color and beautiful view |
| Comparative Example 1 | Grown overall | |
| Comparative Example 2 | Partially grown | |
| Comparative Example 3 | Partially grown | |
| Comparative Example 4 | Partially grown | |

TABLE 3-continued

| Composition | Growth State of Fungi | Note |
| --- | --- | --- |
| Comparative Example 5 | Partially grown | |

While the invention has been described in detail and with reference to specific embodiments thereof, it will be apparent to one skilled in the art that various changes and modifications can be made therein without departing from the spirits and scope thereof.

What is claimed is:

1. A fungiresistant polyorganosiloxane composition comprising
   (A) 100 parts by weight of a polyorganosiloxane having a viscosity at 25° C. of from 100 to 500,000 whereby, each of both of its terminals are blocked with a silanol group or an alkoxy group,
   (B) from 0.1 to 20 parts by weight of an organosilicon compound having on the average more than 2 hydrolyzable groups each bonded to a silicon atom in the molecule,
   (C) from 0.001 to 25 parts by weight of a benzimidazolylcarbamate compound represented by the formula

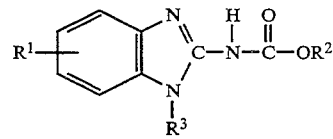

wherein $R^1$ represents a hydrogen atom, an alkyl group having from 1 to 4 carbon atoms, a halogen atom, or a nitro group; $R^2$ represents an alkyl group having from 1 to 4 carbon atoms or an alkoxyalkyl group having from 2 to 4 carbon atoms; and $R^3$ represents a hydrogen atom, an N-substituted or unsubstituted carbamoyl group or an N-substituted or unsubstituted carbamoyloxy group, and
   (D) from 0.001 to 25 parts by weight of bis(2-pyridylthio-1-oxide) zinc salt shown by the formula

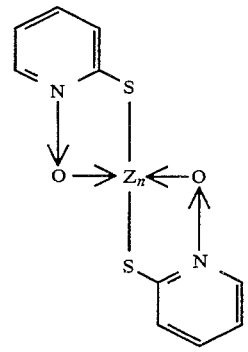

2. The composition as claimed in claim 1, wherein the polyorganosiloxane has a viscosity of from 2,000 to 100,000 cSt.

3. The composition as claimed in claim 1, wherein at least 85% of all organic groups directly bonded to a silicon atom in the polyorganosiloxane are methyl groups.

4. The composition as claimed in claim 3, wherein all organic groups directly bonded to silicon atom in the polyorganosiloxane are methyl groups.

5. The composition as claimed in claim 1, wherein the alkoxy group in the polyorganosiloxane is methoxy, ethoxy or isopropoxy.

6. The composition as claimed in claim 1, wherein the amount of the organosilicon compound is from 0.5 to 10 parts by weight.

7. The composition as claimed in claim 1, wherein the hydrolyzable group in the organosilicon compound is an alkoxy group, an enoxy group, an acyloxy group, an oxime group, an organoaminoxy group, an organoamino group, or an amido group.

8. The composition as claimed in claim 1, wherein the amount of benzimidazolylcarbamate compound is from 0.01 to 1 part by weight.

9. The composition as claimed in claim 1, wherein the amount of the bis(2-pyridylthio-1-oxide)zinc salt is from 0.01 to 1 part by weight.

10. The composition as claimed in claim 1, which further comprises an electrically conductive filler in an amount of from 1 to 150 parts by weight per 100 parts by weight of the component (A).

11. The composition as claimed in claim 1, which further comprises a platinum compound in an amount of from 0.0001 to 0.1 part by weight per 100 parts by weight of the component (A).

* * * * *